(No Model.)
W. BERKEFELD.
SIMPLE MEANS FOR SCOURING FILTERS, &c.
No. 422,112. Patented Feb. 25, 1890.
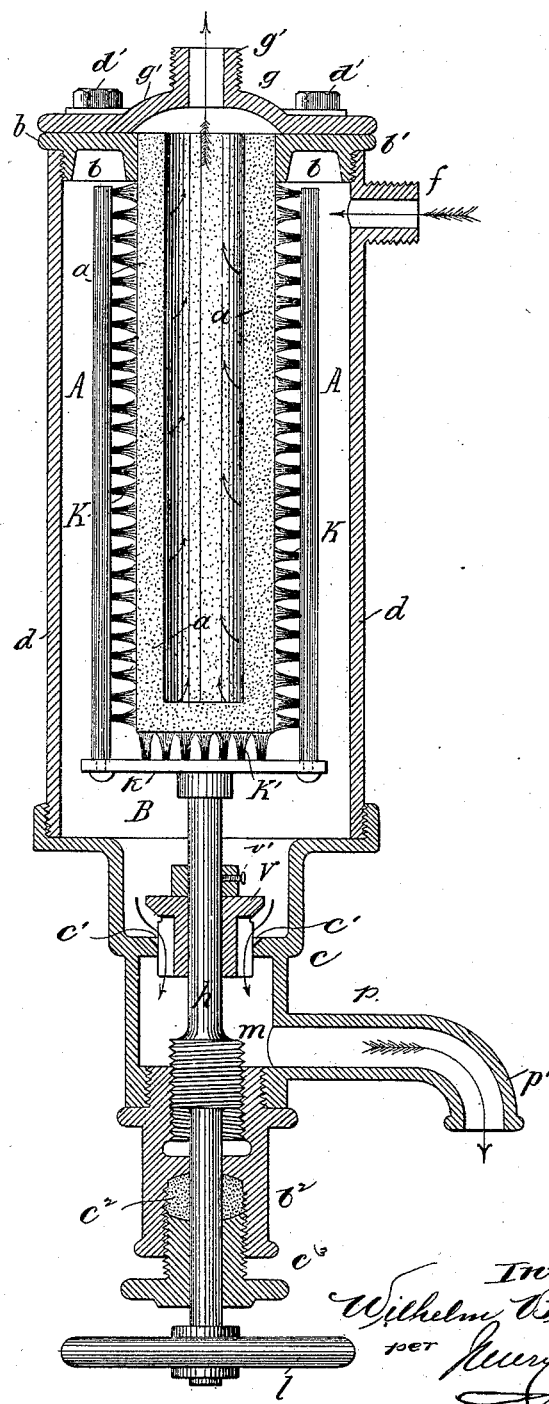

UNITED STATES PATENT OFFICE.

WILHELM BERKEFELD, OF CELLE, PRUSSIA, GERMANY.

SIMPLE MEANS FOR SCOURING FILTERS, &c.

SPECIFICATION forming part of Letters Patent No. 422,112, dated February 25, 1890.

Application filed June 24, 1889. Serial No. 315,375. (No model.) Patented in Germany March 30, 1889; in Belgium May 7, 1889, No. 86,152; in France May 7, 1889, No. 198,014; in England May 7, 1889, No. 7,609; in Italy June 30, 1889, XXIII, 25,448, L, 265, and in Austria-Hungary October 9, 1889.

*To all whom it may concern:*

Be it known that I, WILHELM BERKEFELD, manufacturer, a subject of the King of Prussia, residing at Celle, Prussia, German Empire, have invented certain new and useful Improvements in Devices for Cleansing and Scouring Filters and the like; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention has for its object to provide a simple means for scouring filters and similar devices; and it consists in the combination, with the filtering medium, of a scouring device arranged to operate upon the filtering-surface to cleanse the same of matter deposited thereon in the process of filtration; also in means for flushing the filter to remove the impurities removed from the filtering medium, as hereinafter fully described, and set forth in the claim.

In the accompanying drawings, I have shown by a vertical axial section a filter combined with scouring devices and provided with means for flushing out the deposits scoured off the filtering medium $a$, which in the example given consists of a vertical cylinder of calcined infusorial earth, closed at bottom and supported at its upper open end in a disk or circular head $b$, of any suitable material, as metal, wood, rubber, &c., the cylindrical filter being secured to said head $b$ in any suitable or desired or appropriate manner. The head $b$ is screw-threaded exteriorly and has a flange $b'$, that is seated upon the upper open end of a cylindrical casing $d$, into the upper end of which the head is screwed, so that the filter $a$ is suspended within the casing $d$, which casing is of greater length and diameter than the filter, so as to leave ample room for the scouring devices and for the circulation of the liquid around said filter.

$g$ indicates the cover proper for the cylinder $d$, which is provided with an outlet branch $g'$, and bolted by means of bolts $d'$ to suitable lugs or ears formed on the cylinder $d$ and not shown in the drawings; and $f$ is the inlet branch of said cylinder $d$.

To the lower end of the cylinder $d$ is screwed a valve-casing $c$, in which is formed a valve-seat $c'$ for a valve $v$, that may form an integral part of the valve-stem $h$, or said valve may be adjustably secured to the stem by means of a set-screw $v'$, as shown. The casing has a flushing or discharge branch $p$, and is closed at its outer end by a stuffing-box $b^2$, into which screws the enlarged screw-threaded portion $m$ of the valve-stem $h$, which latter extends through the stuffing-box, its packing $c^2$, and gland $c^3$, and carries at its outer end a hand-wheel $l$.

To the inner end of the valve-stem $h$ is secured a brush-frame $k$, that carries a horizontal brusk $k'$, in contact with the bottom of the filter $a$, and a plurality of vertical brushes in contact with the periphery of said filter. It will be readily seen that when the hand-wheel $l$ is revolved in the proper direction not only will the brushes scour the faces of the filter $a$, but the valve $v$ will be moved off its seat, thereby flushing the cylinder $d$, the impurities flowing out at $p$, so that the operation of the filter need at no time be interrupted by removal from its inclosing-case for the purpose of cleansing the same.

Various structural modifications will readily suggest themselves to the skilled mechanic—as, for instance, any other arrangement of valve controlled by the spindle may be employed. The screw-threaded enlargement of the valve-stem may be dispensed with and the thread formed directly upon the spindle, according to the relative position of the filtering and scouring media. When the filtering medium is arranged as described, I prefer, however, to enlarge that part of the valve-stem, as it affords a more stable bearing therefor.

The filtering medium need not be of the material described, as it may consist of any other sufficiently porous material, nor need said filtering medium be of cylindrical form or arranged in a vertical position, as it may be arranged in a horizontal position; in fact, the filter may be inverted, the outlet branch $p$ thereof being in that case reversed as to its discharge end $p'$.

Having described my invention, what I claim, and desire to secure by patent, is—

The combination, substantially as described, with a tubular filtering medium closed at one end, and its inclosing-casing provided with a purging branch, of a valve interposed between the branch and casing, a revoluble and endwise-movable valve-stem, and scouring media connected with said stem and in contact with the surfaces of the filtering medium.

In testimony whereof I affix my signature in presence of two witnesses.

WILHELM BERKEFELD.

Witnesses:
  LYMAN A. SPALDING,
  D. GURNEY SPALDING.